(12) United States Patent
Yamazaki (10) Patent No.: US 10,944,601 B2
(45) Date of Patent: Mar. 9, 2021

(54) RECEPTION CIRCUIT, RECEIVER, AND RECEPTION CONTROL METHOD

(71) Applicant: FUJITSU LIMITED, Kawasaki (JP)

(72) Inventor: Manabu Yamazaki, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/853,806

(22) Filed: Apr. 21, 2020

(65) Prior Publication Data
US 2020/0358639 A1 Nov. 12, 2020

(30) Foreign Application Priority Data

May 9, 2019 (JP) .............................. JP2019-089337

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .............................. *H04L 25/03057* (2013.01)

(58) Field of Classification Search
CPC ...................... H04L 25/03057; H04L 27/3809

USPC ....... 375/229, 230, 232, 348, 346, 350, 345, 375/344, 326, 371, 373
See application file for complete search history.

(56) References Cited

U.S. PATENT DOCUMENTS

2016/0352557 A1\* 12/2016 Liao .................... H04L 27/3809
2018/0262373 A1 9/2018 Shibasaki

FOREIGN PATENT DOCUMENTS

JP 2018-152731 A 9/2018

\* cited by examiner

*Primary Examiner* — Phuong Phu
(74) *Attorney, Agent, or Firm* — Fujitsu Patent Center (57) ABSTRACT

A reception circuit includes: a first equalizer configured to equalize a reception waveform; a second equalizer configured to equalize an input waveform from the first equalizer; a monitor configured to monitor magnitude of the input waveform; and a controller configured to generate a gain control code used for setting a gain of the first equalizer and a threshold voltage control code used for setting a threshold voltage to be compared with the input waveform in the second equalizer, in accordance with a monitoring result of the magnitude obtained by the monitor.

18 Claims, 11 Drawing Sheets

RECEPTION CIRCUIT, RECEIVER, AND RECEPTION CONTROL METHOD

CROSS-REFERENCE TO RELATED APPLICATION

This application is based upon and claims the benefit of priority of the prior Japanese Patent Application No. 2019-89337, filed on May 9, 2019, the entire contents of which are incorporated herein by reference.

FIELD

The embodiment discussed herein is related to a reception circuit, a receiver, and a reception control method.

BACKGROUND

In recent years, in an information processing apparatus such as a server and a computer, performance (for example, bandwidth) of components such as a central processing unit (CPU) has been significantly improved. To improve the total bandwidth of the entire information processing apparatus, there is a demand for speeding up the operations of transmission and reception circuits configured to transmit and receive data between chips such as CPUs, between a plurality of elements within a chip, or between a plurality of circuit blocks in some cases. In addition, there may be a demand for speeding up the operations of transmission and reception circuits configured to transmit and receive data between boards, between housings, or the like. As discussed above, in the transmission and reception circuits where high-speed data communication is demanded in electric communication or optical communication, an equalizer, for example, is used in order to compensate for deterioration in data signals generated in a communication path.

Japanese Laid-open Patent Publication No. 2018-152731 is an example of related art.

SUMMARY

According to an aspect of the embodiments, a reception circuit includes: a first equalizer configured to equalize a reception waveform; a second equalizer configured to equalize an input waveform from the first equalizer; a monitor configured to monitor magnitude of the input waveform; and a controller configured to generate a gain control code used for setting a gain of the first equalizer and a threshold voltage control code used for setting a threshold voltage to be compared with the input waveform in the second equalizer, in accordance with a monitoring result of the magnitude obtained by the monitor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, since a waveform (reception waveform) of a reception signal varies depending on loss, temperature, or the like, it is difficult to accurately determine a value of the reception signal.

A reception circuit, a receiver, and a reception control method able to accurately determine a value of a reception signal may be provided.

Figure 1:
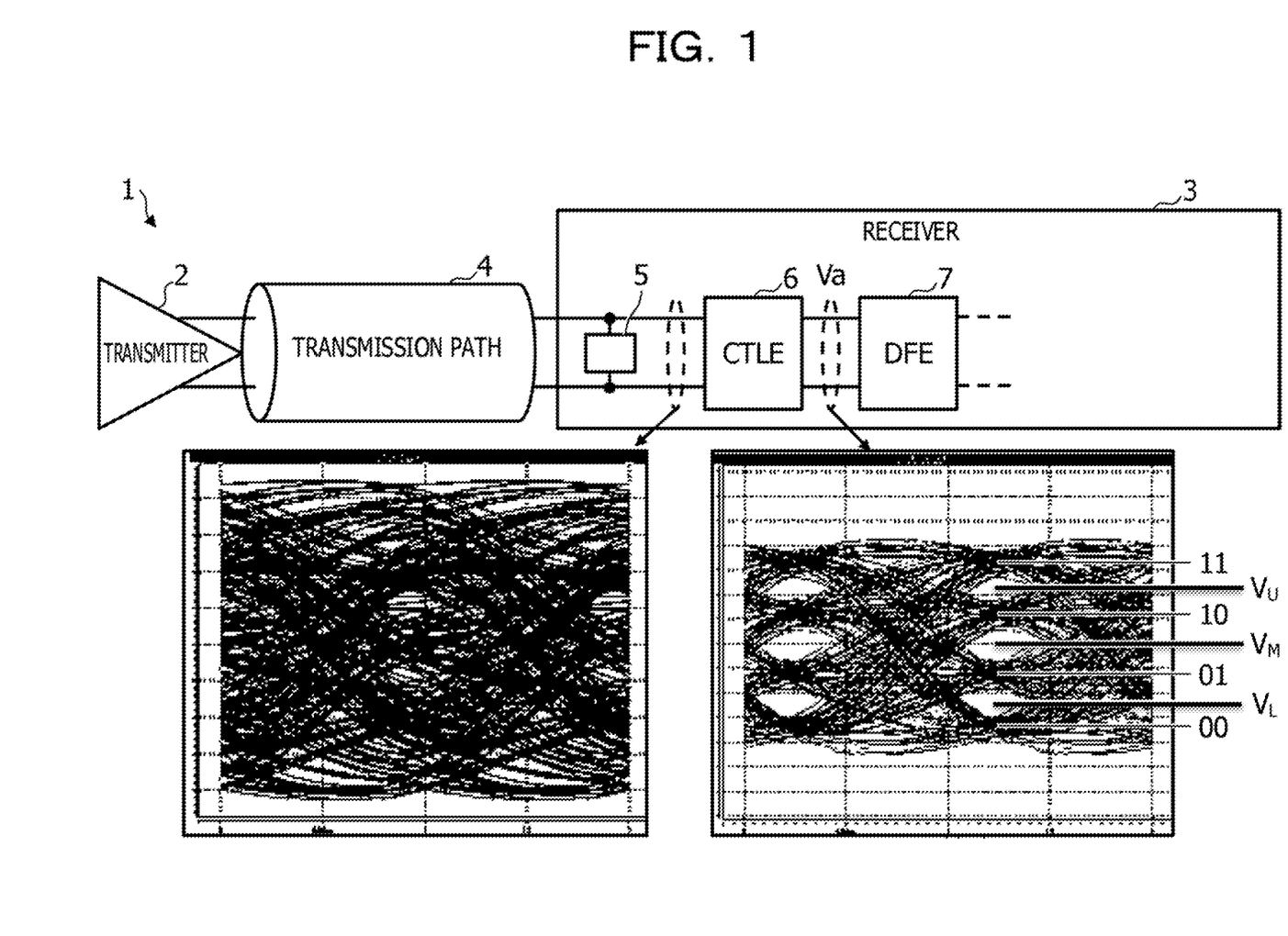
FIG. 1 is a diagram illustrating a configuration example of a transmission system according to an embodiment.

FIG. 1 is a diagram illustrating a configuration example of a transmission system according to an embodiment. A transmission system 1 illustrated in FIG. 1 includes a transmitter 2 configured to transmit a signal, a transmission path 4, in which the signal transmitted from the transmitter 2 is transmitted, and a receiver 3 configured to receive the signal transmitted from the transmitter 2 via the transmission path 4. The receiver 3 includes a termination resistor 5, a continuous time linear equalizer (CTLE) 6, and a decision feedback equalizer (DFE) 7. The CTLE 6 is an example of a first equalizer configured to equalize a reception waveform. The DFE 7 is an example of a second equalizer configured to equalize an input waveform from the first equalizer.

The transmitter 2 transmits a data signal D having $2^n$ values (n is a natural number) per symbol, to the transmission path 4. One symbol is also referred to as one unit interval (UI). The data signal D includes a signal obtained by two-value modulation having two values of 0 and 1 such as non return to zero (NRZ), a signal obtained by pulse amplitude modulation (PAM) having $2^m$ values (m is an integer equal to or greater than 2), or the like. FIG. 1 exemplifies a signal (PAM4 signal) obtained by pulse amplitude modulation having four values. The receiver 3 detects a signal level of the data signal D received from the transmission path 4, and demodulates the data.

The CTLE 6 receives the data signal D from the transmission path 4 via the termination resistor 5, performs amplification processing and equalization processing (may perform only amplification processing) on the waveform of the received data signal D, and then outputs a waveform corresponding to the data signal D. Since the CTLE 6 may have a known configuration, the detailed configuration thereof will not be described.

The DFE 7 performs equalization processing to suppress intersymbol interference (ISI) of the waveform output from the CTLE 6 (an input waveform Va from the CTLE 6) by changing a threshold voltage of a sampler, and outputs digital data sampled by the sampler from the input waveform Va. Since the DFE 7 may have a known configuration, the detailed configuration thereof will not be described.

In order to satisfy detection accuracy of an eye opening by the DFE 7 and in order for the DFE 7 to correctly determine four values (00, 01, 10, 11) of the PAM4 signal, it is desirable to correctly set three threshold voltages $V_U$, $V_M$, and $V_L$ used in the determination. However, the waveform of the reception signal input to the receiver 3 varies depending on the loss in the transmission path 4 or the like, change in temperature of the elements, and the like. To deal with such a variation, the receiver 3 according to the present disclosure adjusts a gain of the CTLE 6 to make a variation width of the input waveform Va to the DFE 7 become fixed, and adjusts each position of the multiple threshold voltages $V_U$, $V_M$, and $V_L$ of the DFE 7 to the center of the eye opening corresponding to the input waveform Va.

The receiver 3 according to the present disclosure is provided with a reception circuit configured to monitor the input waveform Va from the CTLE 6 to the DFE 7, and control the gain of the CTLE 6 and at least one threshold voltage of the DFE 7 in accordance with the monitoring result. Further, the receiver 3 is provided with a power saving reception circuit configured to minimize deterioration in the main signal (the reception signal received from the transmission path 4).

Next, a configuration example of a receiver used in a transmission system will be described in more detail.

Figure 2:
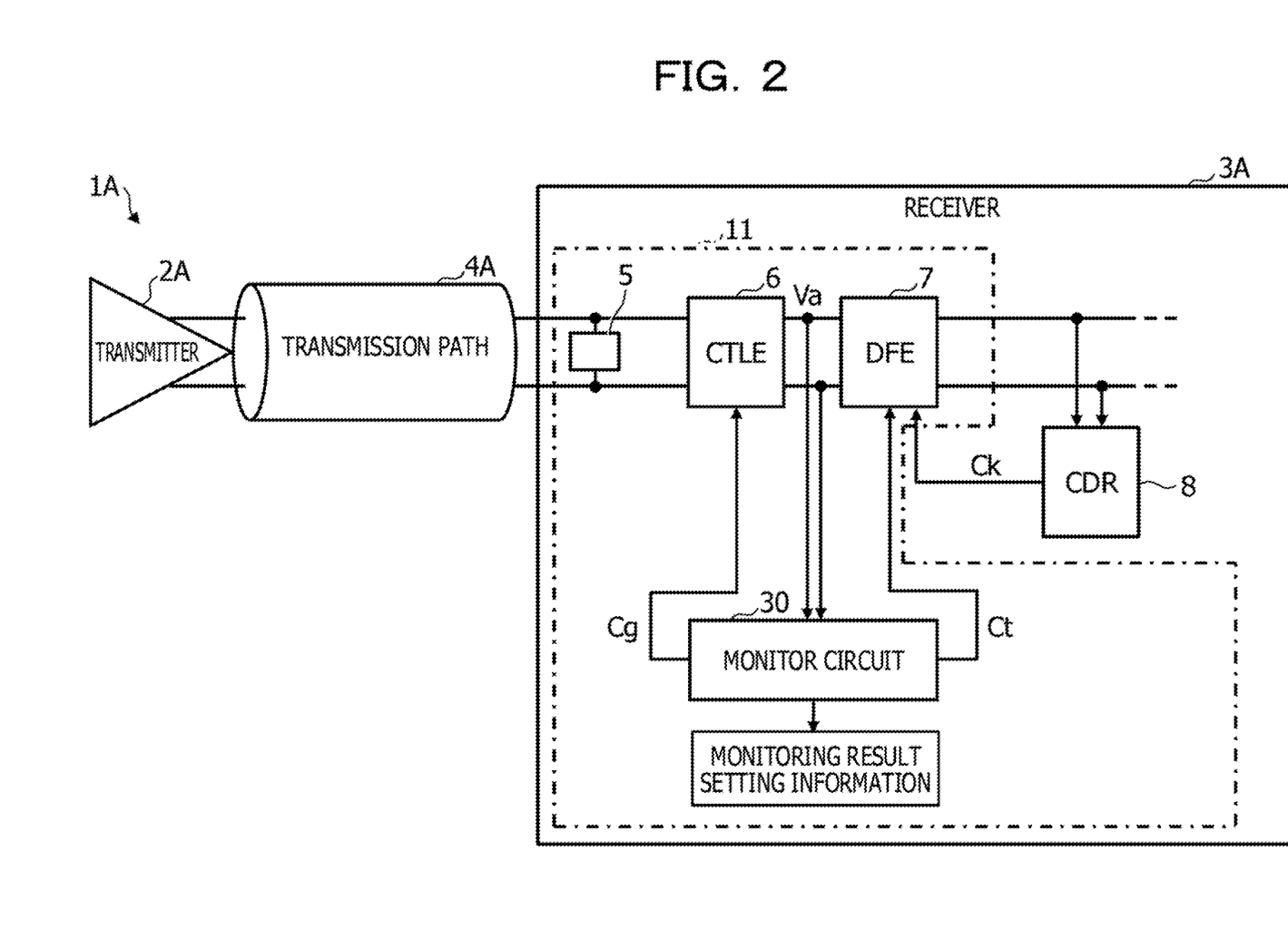
FIG. 2 is a diagram illustrating a configuration example of a transmission system in a case of an electric interface.

FIG. 2 is a diagram illustrating a configuration example of a transmission system in a case of an electric interface. A transmission system 1A illustrated in FIG. 2 includes a transmitter 2A configured to transmit a signal, a transmission path 4A, in which the signal transmitted from the transmitter 2A is transmitted, and a receiver 3A configured to receive the signal transmitted from the transmitter 2A via the transmission path 4A.

Since the transmitter 2A is similar to the transmitter 2 (see FIG. 1), detailed description thereof will be omitted. The transmission path 4A is an electric communication path coupled between the transmitter 2A and the receiver 3A. Specific examples of the transmission path 4A include electric wiring (including wiring formed on a substrate) and a coupler.

The receiver 3A includes a reception circuit 11 and a clock data recovery (CDR) circuit 8. The reception circuit 11 receives a signal from the transmission path 4A. The reception circuit 11 includes a termination resistor 5, a CTLE 6, a DFE 7, and a monitor circuit 30. The CDR circuit 8 is an example of a clock data recovery circuit. The CDR circuit 8 reproduces digital data and a clock signal Ck from an output signal of the DFE 7, and supplies the reproduced clock signal Ck to the DFE 7. The CDR circuit 8 adjusts the phase of the clock signal Ck in order to perform data determination (sampling) at an appropriate timing. The DFE 7 performs equalization processing on an input waveform Va from the CTLE 6 to the DFE 7 in response to the clock signal Ck, and outputs digital data sampled by a sampler from the input waveform Va. When the signal received by the receiver 3A is a PAM4 signal, the DFE 7 outputs digital data corresponding to four values (00, 01, 10, 11).

The monitor circuit 30 monitors the magnitude of the input waveform Va from the CTLE 6 to the DFE 7, and generates a gain control code Cg and a threshold voltage control code Ct in accordance with the monitoring result. The gain control code Cg is used to set a gain of signal amplification in the CTLE 6. The threshold voltage control code Ct is used to set a threshold voltage Vth (in the case of the PAM4 signal, three threshold voltages $V_U$, $V_M$, and $V_L$) to be compared with the input waveform Va in the DFE 7. Since the gain control code Cg is generated in accordance with the monitoring result of the magnitude of the input waveform Va, the gain of the CTLE 6 may be adjusted in accordance with the monitoring result, thereby making it possible to adjust the input waveform Va to the magnitude suitable for setting the threshold voltage Vth. Further, since the threshold voltage control code Ct is generated in accordance with the monitoring result of the magnitude of the input waveform Va, the threshold voltage Vth may be adjusted to a position suitable for intersecting with an eye opening of the input waveform Va. As described above, since the gain control code Cg and the threshold voltage control code Ct are generated in accordance with the monitoring result of the magnitude of the input waveform Va, the value of the reception signal input from the transmission path 4A to the reception circuit 11 may be accurately determined.

It is preferable that the monitor circuit 30 be coupled between the CTLE 6 and the DFE 7 in such a manner as not to affect the output drive of the CTLE 6 and the input of the DFE 7 as much as possible. For example, the monitor circuit 30 has a configuration in which a small transistor having little influence on the output drive of the CTLE 6 and the input of the DFE 7 is used as the input (gate coupling), and is coupled between the CTLE 6 and the DFE 7 via this transistor.

The monitor circuit 30 may operate in a band lower than that of the main signal (reception signal) (for example, a low band substantially less than or equal to half of the main signal). When seen from the CTLE 6, since the monitor circuit 30 is a load on the CTLE 6, a drive current requested to the CTLE 6 (a current requested to operate the monitor circuit 30) increases in order to make the monitor circuit 30 operate at high speed (for example, full rate operation). Therefore, the circuit scale of the CTLE 6 is increased, and the power consumption of the CTLE 6 is also increased. However, in a case where the monitor circuit 30 does not perform full rate operation, it is possible to reduce the circuit scale of the CUE 6 and decrease the power consumption of the CUE 6 as compared to the case where the full rate operation is performed.

The monitor circuit 30 may output the monitoring result (the magnitude of the input waveform Va) and setting information (the gain control code Cg and the threshold voltage control code Ct) to the inside or outside of the receiver 3A. Based on these pieces of information, state monitoring (operation states, loss-of-signal detection, and the like) of the receiver and the transmission system may be enabled.

Figure 3:
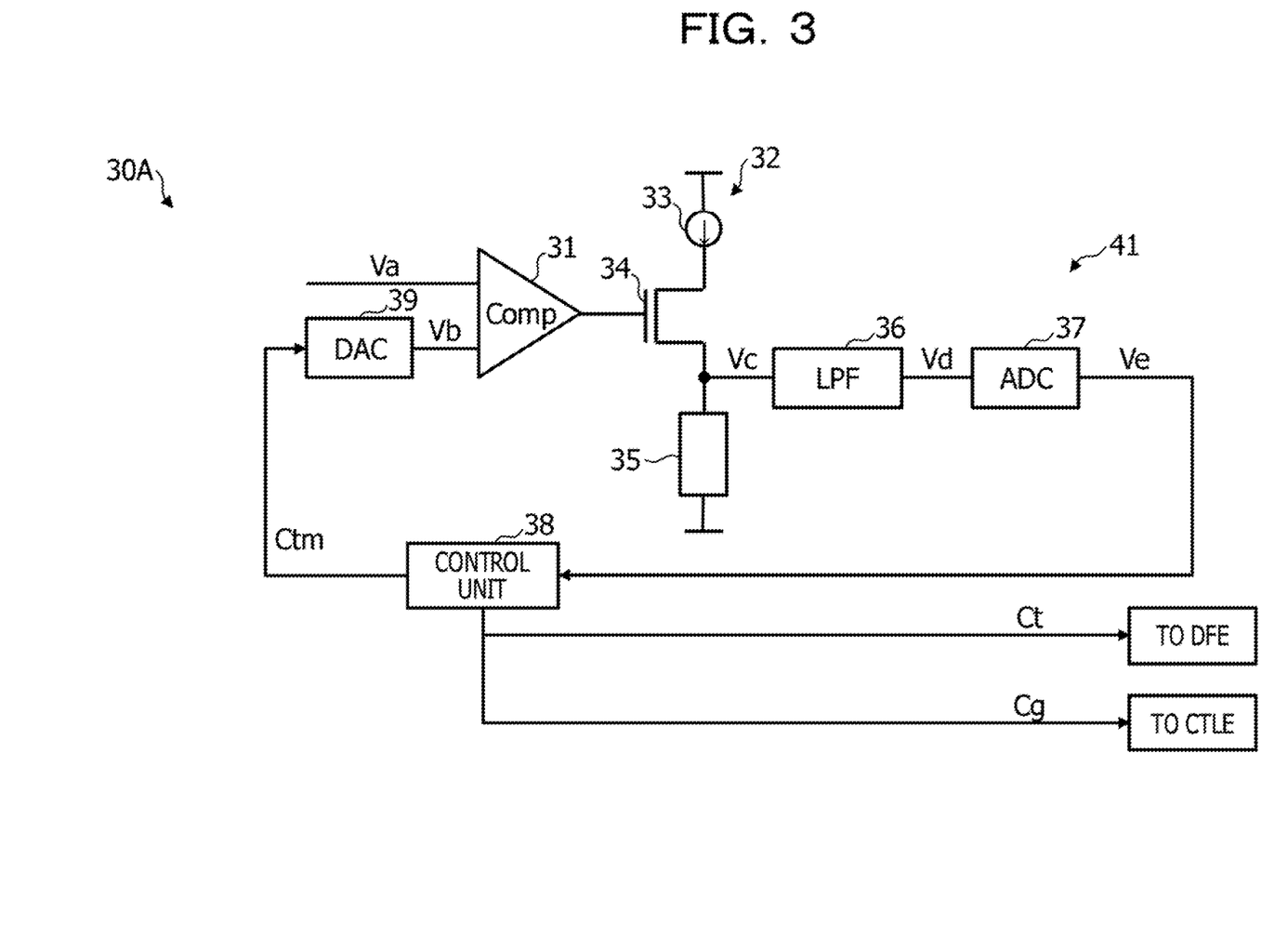
FIG. 3 is a diagram illustrating a first configuration example of a monitor circuit.

FIG. 3 is a diagram illustrating a first configuration example of a monitor circuit. A monitor circuit 30A illustrated in FIG. 3 is an example of the monitor circuit 30 (see FIG. 2). The monitor circuit 30A monitors magnitude of an input waveform Va. When the input waveform Va is a differential signal, a reception circuit includes the monitor circuit 30A on the positive side for monitoring the magnitude of a positive-side input waveform Vap of the differential input waveform Va, and the monitor circuit 30A on the negative side for monitoring the magnitude of a negative-side input waveform Van of the differential input waveform Va. For example, the reception circuit includes a pair of monitor circuits 30A. The monitor circuit 30A is provided with a monitor unit 41 and a control unit 38.

The monitor unit 41 monitors the magnitude of the input waveform Va, and outputs a monitoring result Ve obtained by the monitoring. The monitor unit 41 includes a comparator 31, a level conversion circuit 32, a low pass filter (LPF) 36, an analog to digital converter (ADC) 37, and a digital to analog converter (DAC) 39.

The comparator 31 compares the input waveform Va to the DFE 7 with a threshold value Vb generated by the DAC 39, and outputs a signal representing the comparison result to the level conversion circuit 32.

The level conversion circuit 32 converts the level of the input signal from the comparator 31 into a voltage level within an input range of the ADC 37, and outputs the converted voltage level. The level conversion circuit 32 includes a series circuit in which a current source 33, a transistor 34, to which the current is supplied from the current source 33, and a resistor 35 coupled to the transistor 34 are coupled in series.

The input waveform Va is compared with the threshold value Vb by the comparator 31, and a pulse waveform Vc is generated from the level conversion circuit 32 in accordance with the comparison result. For example, when the input waveform Va is equal to or larger than the threshold value Vb (Va≥Vb), the level of the pulse waveform Vc comes to be a high level within the input range of the ADC 37, and when the input waveform Va is lower than the threshold value Vb, the level thereof comes to be a low level. In this embodiment, the active level of the pulse waveform Vc is defined at a high level, but the configuration of the monitor circuit may be formed by defining the active level of the pulse waveform Vc at a low level.

The LPF 36 is an example of a filter configured to smooth the pulse waveform Vc. The LPF 36 outputs an analog signal Vd obtained by smoothing the pulse waveform Vc. The voltage value of the analog signal Vd of the LPF 36 corresponds to the magnitude (for example, the variation width) of the input waveform Va.

The ADC 37 converts the analog signal Vd input from the LPF 36 to a digital signal and outputs the digital signal. The digital signal output from the ADC 37 represents the monitoring result Ve of the magnitude of the input waveform Va. The larger the value of the digital signal is, the larger the input waveform Va is.

The control unit 38 performs correction for a drop in band relative to the reception signal, generates the threshold voltage control code Ct in accordance with the monitoring result Ve, and supplies the threshold voltage control code Ct to the DFE 7. In the case where the accuracy of the monitoring result Ve obtained is sufficient, the correction for the drop in band relative to the reception signal may not be performed. The control unit 38 adjusts the threshold voltage control code Ct in such a manner that the threshold voltage Vth intersects with the eye opening of the input waveform Va. Thus, the DFE 7 is able to determine the value of the reception signal with high accuracy.

In accordance with the monitoring result Ve, the control unit 38 detects an amount of excess or deficiency of the magnitude of the input waveform Va (for example, the variation width), generates the gain control code Cg corresponding to the amount of excess or deficiency thereof, and supplies the generated gain control code Cg to the DFE 7. The control unit 38 adjusts the gain control code Cg in accordance with the amount of excess or deficiency of the magnitude of the input waveform Va (for example, the variation width), thereby making it possible to adjust the threshold voltage Vth to a position suitable for the intersection with the eye opening of the input waveform Va. Further, it is possible to adjust the size and position of the eye opening of the input waveform Va in such a manner that the threshold voltage Vth intersects with the eye opening of the input waveform Va.

The control unit 38 adjusts the gain control code Cg in such a manner that the magnitude of the input waveform Va takes a desired value, for example, in accordance with the monitoring result Ve. Thus, the input waveform Va may be adjusted to the magnitude suitable for the threshold voltage Vth intersecting with the eye opening of the input waveform Va. Further, it is possible to adjust the size and position of the eye opening of the input waveform Va in such a manner that the threshold voltage Vth intersects with the eye opening of the input waveform Va.

The control unit 38 generates a threshold control code Ctm in accordance with the monitoring result Ve, and supplies the generated threshold control code Ctm to the DAC 39. The threshold control code Ctm is used for setting the threshold value Vb. The DAC 39 sets the threshold value Vb in accordance with the threshold control code Ctm.

Figure 4:
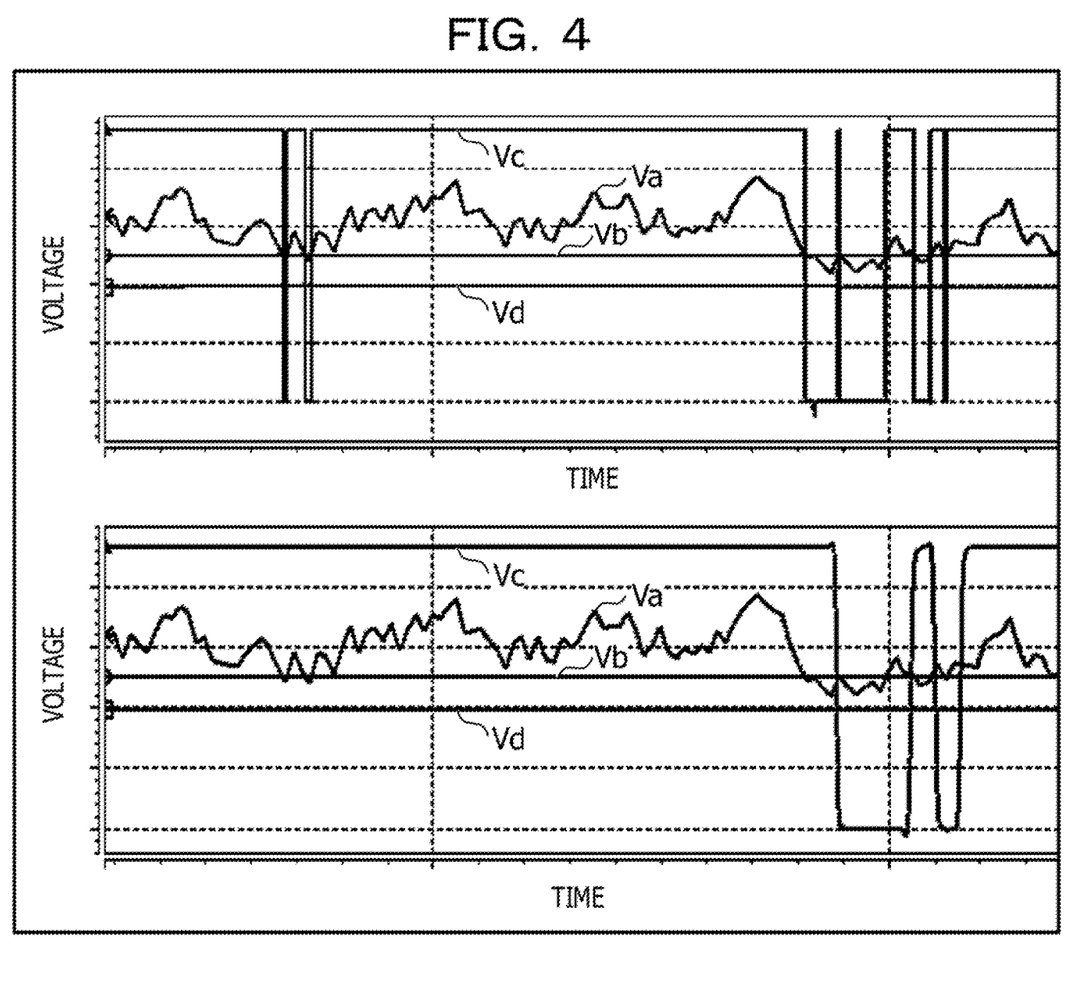
FIG. 4 is a diagram exemplifying waveforms of respective portions of a monitor circuit when a threshold voltage is at a lower level relative to an input voltage.
Figure 5:
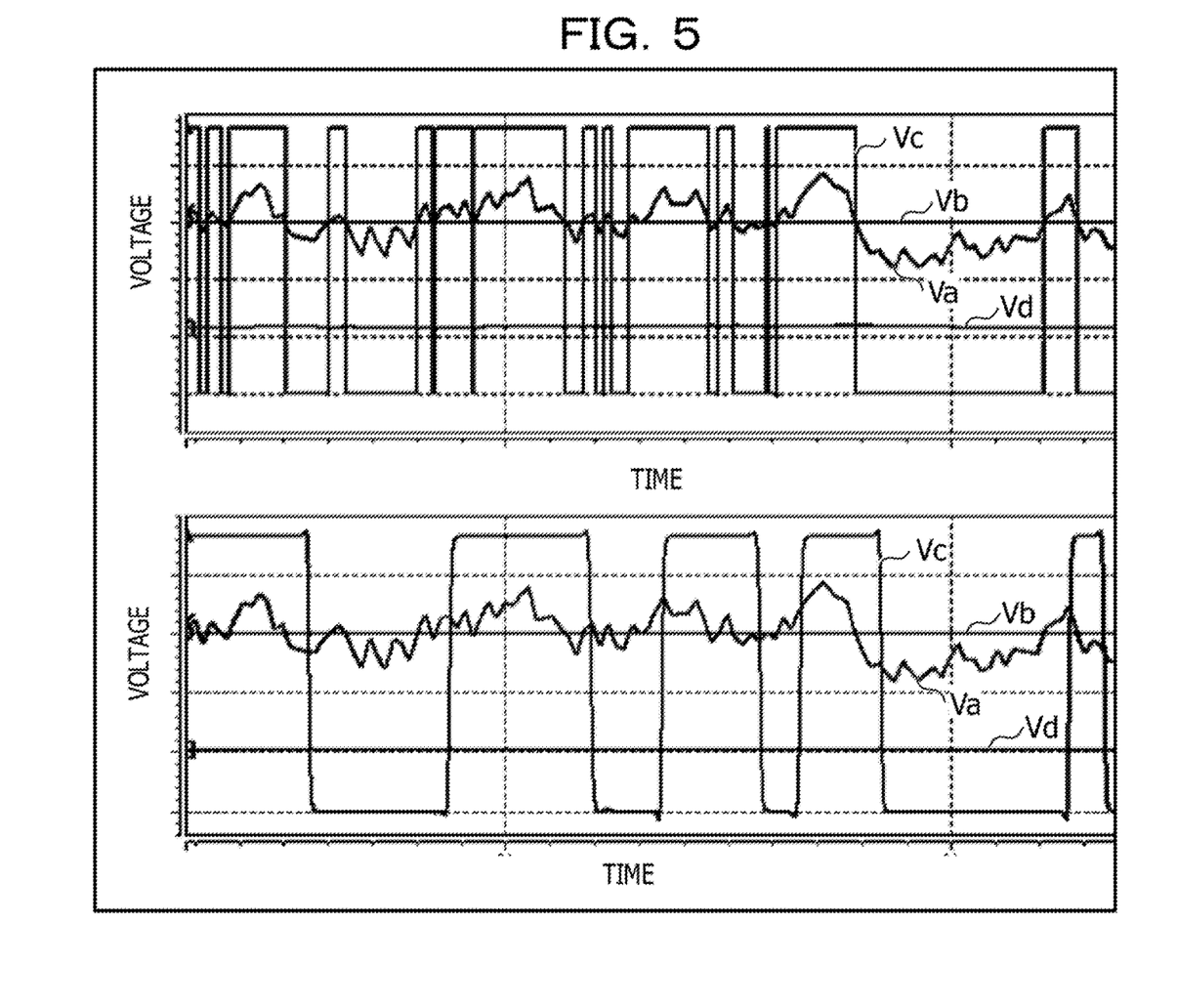
FIG. 5 is a diagram exemplifying waveforms of respective portions of a monitor circuit when a threshold voltage is substantially at a middle level relative to an input voltage.
Figure 6:
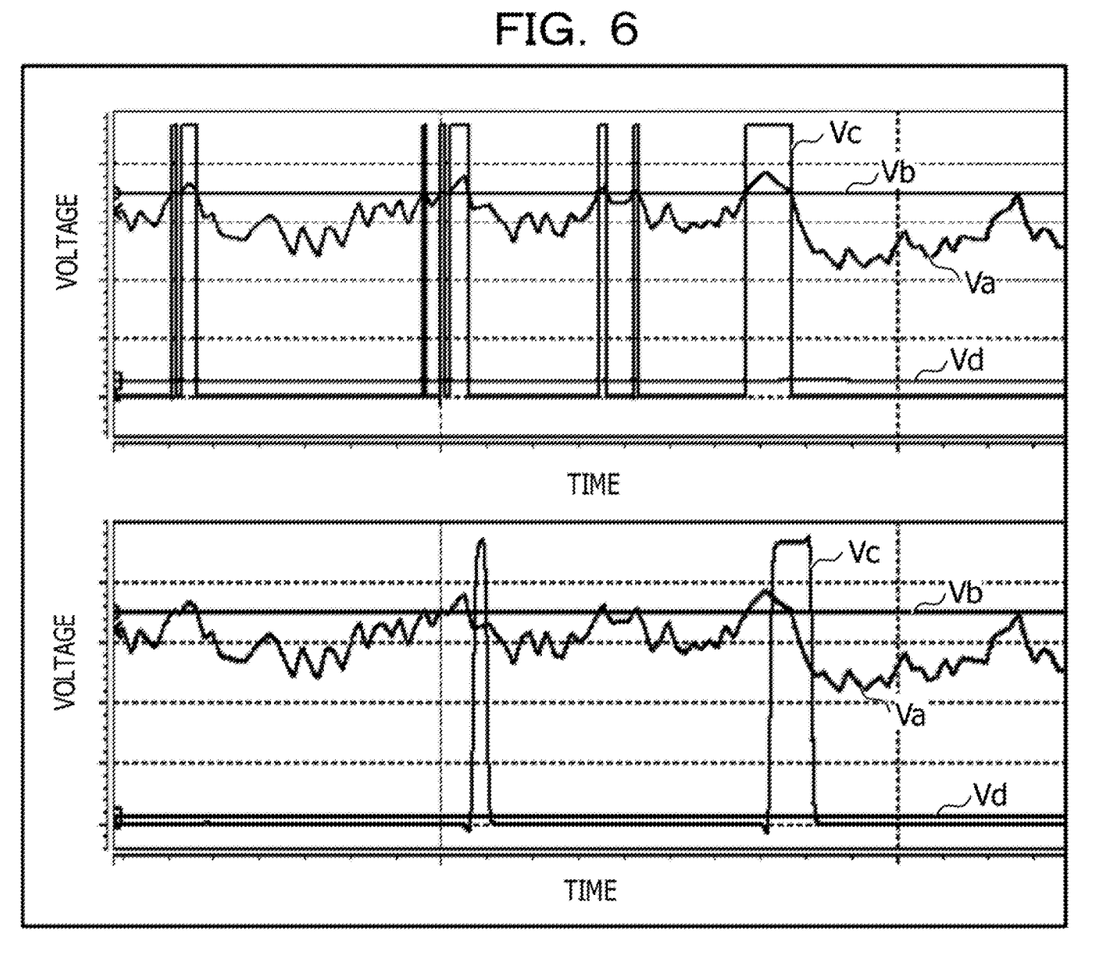
FIG. 6 is a diagram exemplifying waveforms of respective portions of a monitor circuit when a threshold voltage is at a higher level relative to an input voltage.
Figure 7:
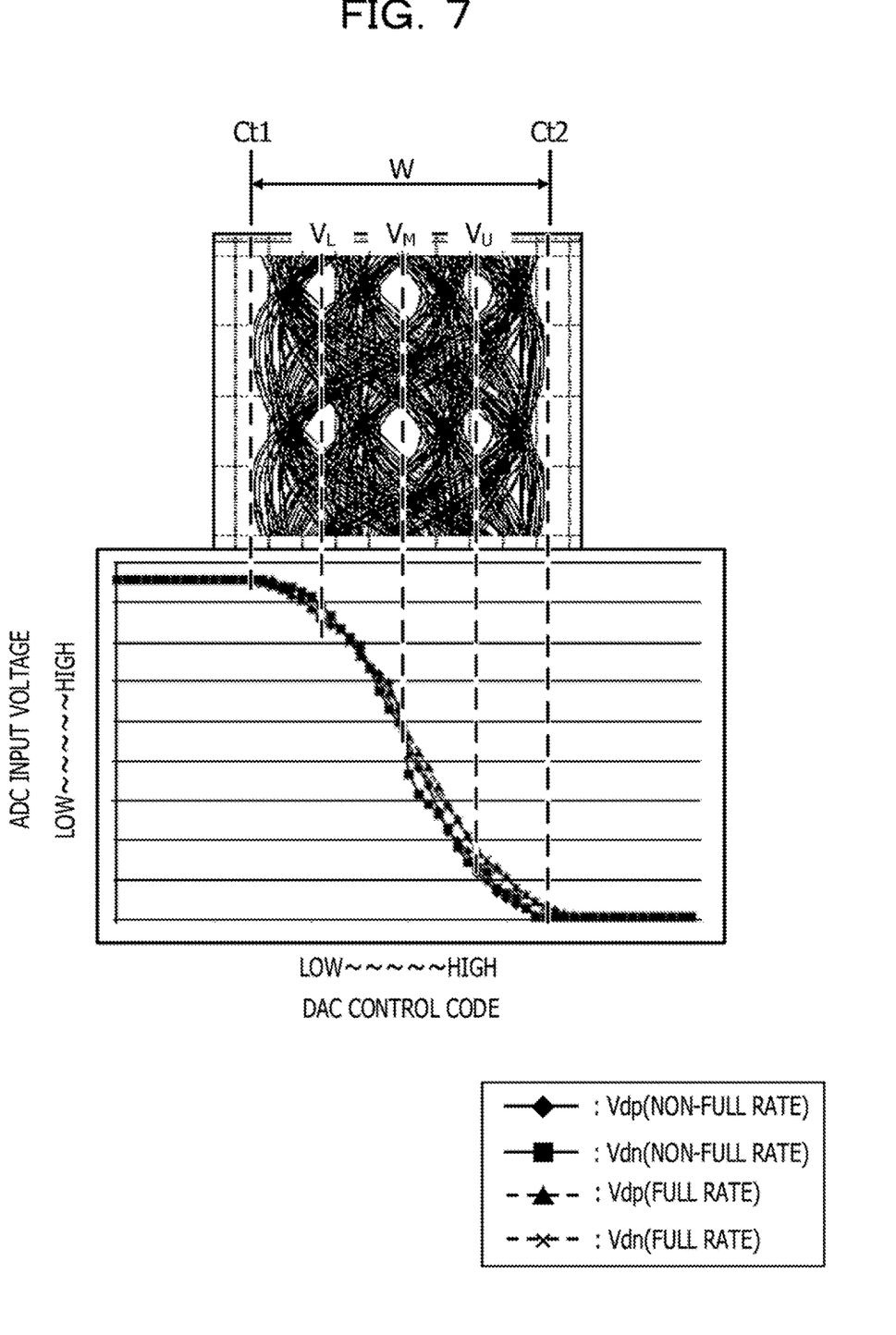
FIG. 7 is a diagram exemplifying a relationship between a DAC control code and an eye waveform.

FIG. 4 is a diagram exemplifying waveforms of respective portions of the monitor circuit when the threshold value Vb is at a lower level of voltage relative to the input waveform Va. FIG. 5 is a diagram exemplifying waveforms of respective portions of the monitor circuit when the threshold value Vb is substantially at a middle level of voltage relative to the input waveform Va. FIG. 6 is a diagram exemplifying waveforms of respective portions of the monitor circuit when the threshold value Vb is at a higher level of voltage relative to the input waveform Va. In each of FIGS. 4 to 6, the upper graph illustrates a case where the monitor unit 41 performs full rate operation, and the lower graph illustrates a case where the monitor unit 41 does not perform the full rate operation (a case of performing non-full rate operation). The lower part of FIG. 7 illustrates a change in the ADC input voltage (analog signal Vd) when the DAC control code (threshold control code Ctm) used for setting the threshold value Vb is swept. An analog signal Vdp represents the analog signal Vd when the magnitude of the positive-side input waveform Vap of the differential input waveform Va is monitored by the monitor circuit 30A. The analog signal Vdn represents the analog signal Vd when the magnitude of the negative-side input waveform Van of the differential input waveform Va is monitored by the monitor circuit 30A.

As illustrated in FIGS. 4 to 6, the pulse waveform Vc significantly differs depending on presence/absence of the full rate operation. However, as illustrated in the lower part of FIG. 7, it is understood that the waveform of the ADC input voltage (analog signal Vd) hardly differs depending on presence/absence of the full rate operation. In a high-speed serial transfer method such as 8b/10b, the transmission program is produced in such a manner that each value in a multilevel amplitude signal such as PAM4 appears at approximately the same frequency. Therefore, even when the monitor unit 41 operates in a state where the band is limited (for example, even when the magnitude of the input waveform Va is monitored at a frequency lower than that of the reception waveform), the monitor unit 41 is able to obtain the ADC input voltage (analog signal Vd) having substantially the same characteristics with respect to the DAC control code. In this manner, by operating the monitor circuit 30 in a band lower than the main signal (reception signal) (for example, a low band substantially equal to or less than half of the main signal), it is possible to reduce the circuit scale of the CE 6, and reduce the power consumption of the CTLE 6.

Figure 8:
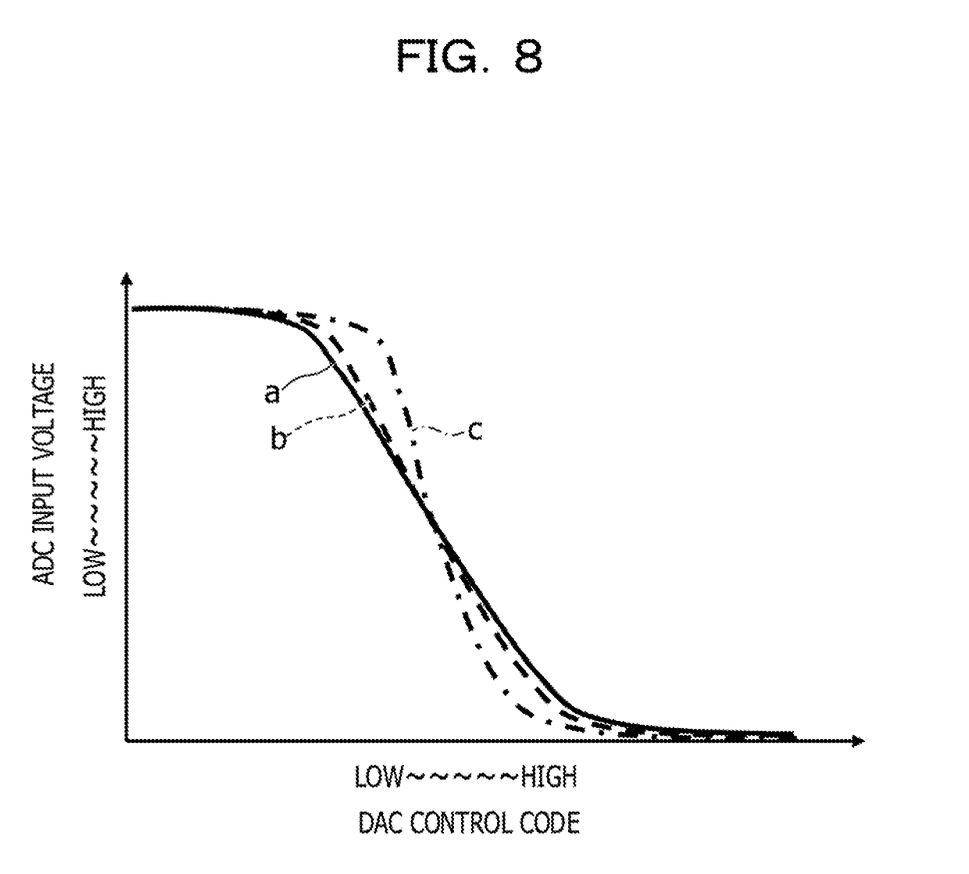
FIG. 8 is a diagram exemplifying a relationship between a DAC control code and an ADC input voltage.

FIG. 8 is a diagram exemplifying a relationship between the DAC control code (threshold control code Ctm) and the ADC input voltage (analog signal Vd). A waveform "a" is a characteristic in the case where the monitor unit 41 is configured to perform full rate operation. A waveform "b" is a characteristic in the case where the monitor unit 41 is configured to perform half rate operation. By correcting the waveform b as desired in such a manner that an error between the waveform a and the waveform b becomes small, it is also possible to make the characteristics of the monitor unit 41 approach the characteristics at the time of the full rate operation.

A waveform "c" is a characteristic when the monitor unit 41 is configured to operate in a band of about one tenth of the reception signal (for example, when the operation band is excessively lowered). Compared to the case of the full rate operation, the accuracy of the detection of the eye waveform and the threshold value setting of the DFE 7 is lowered. Even when the waveform c is so corrected as to make an error between the waveform a and the waveform c become small, there is a risk that an error caused by the error of the correction calculation becomes large. For example, it is preferable to design the operation band of the monitor unit 41 in such a manner that an error with respect to the characteristic at the time of full rate operation falls within an allowable range or within a range where the error may be corrected.

The upper part of FIG. 7 illustrates an eye waveform rotated clockwise by 90°. As illustrated in FIG. 7, the control unit 38 is able to estimate a variation width of the input waveform Va by sweeping the DAC control code (threshold control code Ctm) in accordance with the monitoring result Ve. The magnitude of the ADC input voltage (analog signal Vd) corresponds to the magnitude of the input waveform Va. Accordingly, the control unit 38 specifies a first control code Ct1 to cause the magnitude of the input waveform Va to converge or reach to a maximum value, and a second control code Ct2 to cause the magnitude thereof to converge or reach to a minimum value, thereby making it possible to specify the control code range W corresponding to the variation width of the input waveform Va.

The control unit 38 specifies the control code range W corresponding to the variation width of the input waveform Va in accordance with the monitoring result Ve, and adjusts the gain control code Cg in accordance with the width of the control code range W. Thus, the variation width of the input waveform Va may be adjusted to the width suitable for setting the threshold voltage Vth to intersect with the eye waveform of the input waveform Va. The control unit 38 may adjust the gain control code Cg so that the control code range W becomes fixed. Accordingly, it is possible to adjust the variation width of the input waveform Va to a fixed width suitable for setting the threshold voltage Vth to intersect with the eye waveform of the input waveform Va.

The control unit 38 adjusts the threshold voltage control code Ct to a code corresponding to a control code included in the control code range W. For example, the control unit 38 searches for the threshold control code Ctm within the control code range W to make the threshold voltage Vth (the threshold voltages $V_U$, $V_M$, $V_L$ in the case of FIG. 7) intersect with the eye opening of the input waveform Va. The control unit 38 supplies, to the DFE 7, the threshold voltage control code Ct corresponding to the threshold control code Ctm obtained by the search. This makes it easy to set the threshold voltage Vth of the DFE 7.

For example, the control unit 38 sets the threshold voltage control code Ct for the threshold voltage $V_L$ to a code corresponding to three tenths of the control code range W. Similarly, the control unit 38 sets the threshold voltage control code Ct for the threshold voltage $V_M$ to a code corresponding to five tenths of the control code range W, and sets the threshold voltage control code Ct for the threshold voltage $V_U$ to a code corresponding to seven tenths of the control code range W.

Figure 9:
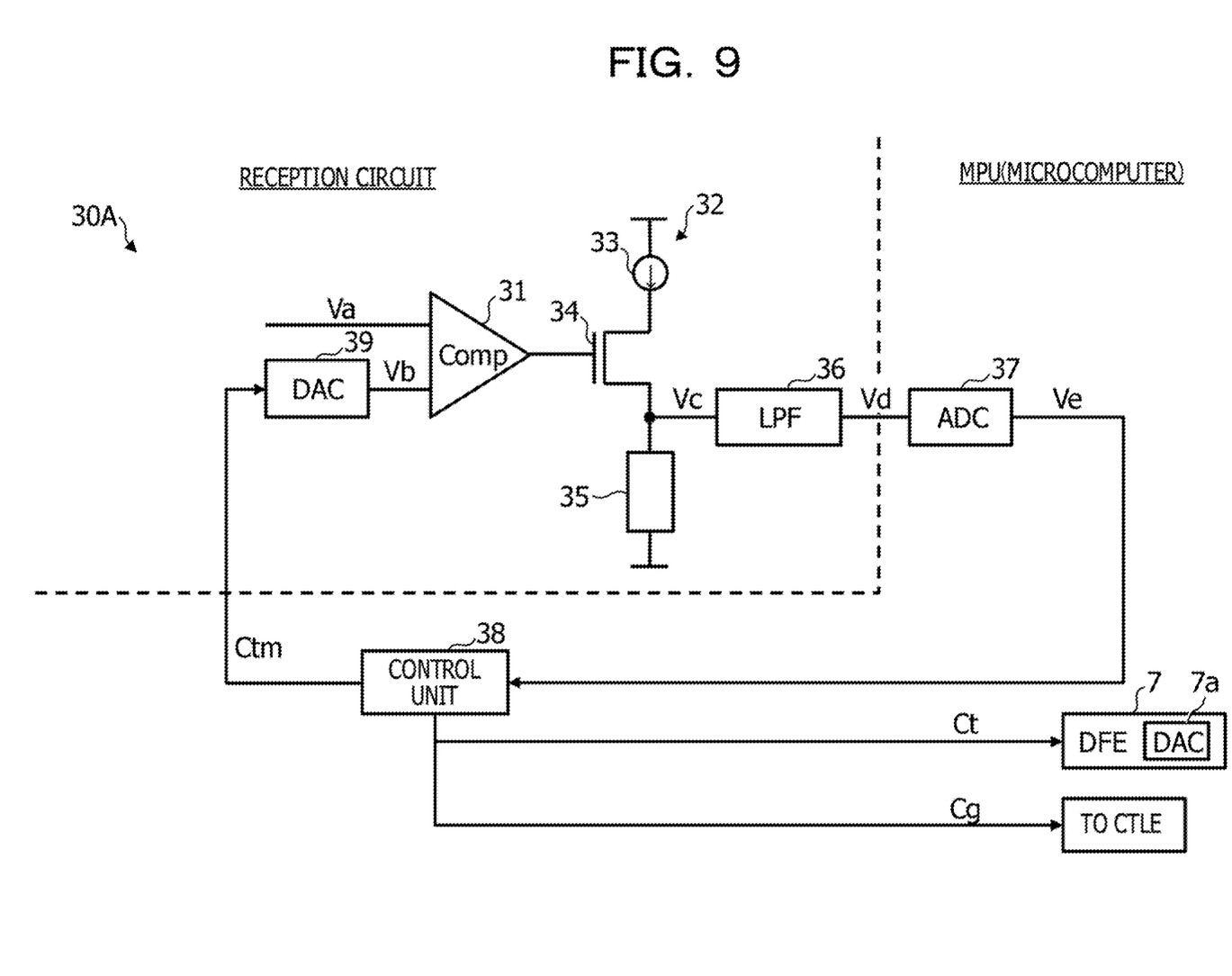
FIG. 9 is a diagram illustrating the first configuration example of a monitor circuit.

FIG. 9 is a diagram illustrating arrangement in the first configuration example of the monitor circuit. The ADC 37 of the monitor circuit 30A may use an ADC mounted on a microcomputer (MPU) at the outside of the reception circuit 11. The microcomputer illustrated in FIG. 9 includes the ADC 37, the control unit 38, the DFE 7, and the CDR circuit 8 (see FIG. 3).

In FIG. 9, the DFE 7 includes a DAC 7a, which is an example of a first setting portion configured to set the threshold voltage Vth in accordance with the threshold voltage control code Ct. The monitor circuit 30A includes the DAC 39, which is an example of a second setting portion configured to set the threshold value Vb in accordance with the threshold control code Ctm.

When the configurations or characteristics of the DAC 7a and the DAC 39 are different from each other, the control unit 38 sets the threshold voltage control code Ct to a code corresponding to the threshold control code Ctm, based on correlation data (for example, table data) between the DAC 39 and the DAC 7a. When the configurations or characteristics of the DAC 7a and the DAC 39 are different from each other, voltages output from the two DACs are not regularly equal to each other even if the codes input to both the DACs are the same. Therefore, the control unit 38 is able to generate the threshold voltage control code Ct corresponding to the threshold control code Ctm specified by the sweep based on the correlation data defining the correspondence relationship between the threshold control code Ctm for the DAC 39 and the threshold voltage control code Ct for the DAC 7a.

On the other hand, when the configurations and characteristics of the DAC 7a and the DAC 39 are identical to each other, the control unit 38 sets the threshold voltage control code Ct to a code identical to the threshold control code Ctm. When the configurations and characteristics of the DAC 7a and DAC 39 are identical to each other, the voltages output from both the DACs are identical when the codes input to both the DACs are identical. Accordingly, the control unit 38 is able to use the same code as the threshold control code Ctm specified by the sweep, for the threshold voltage control code Ct. In this case, the DAC 39 may use the DAC mounted on the microcomputer (MPU) at the outside of the reception circuit 11.

Figure 10:
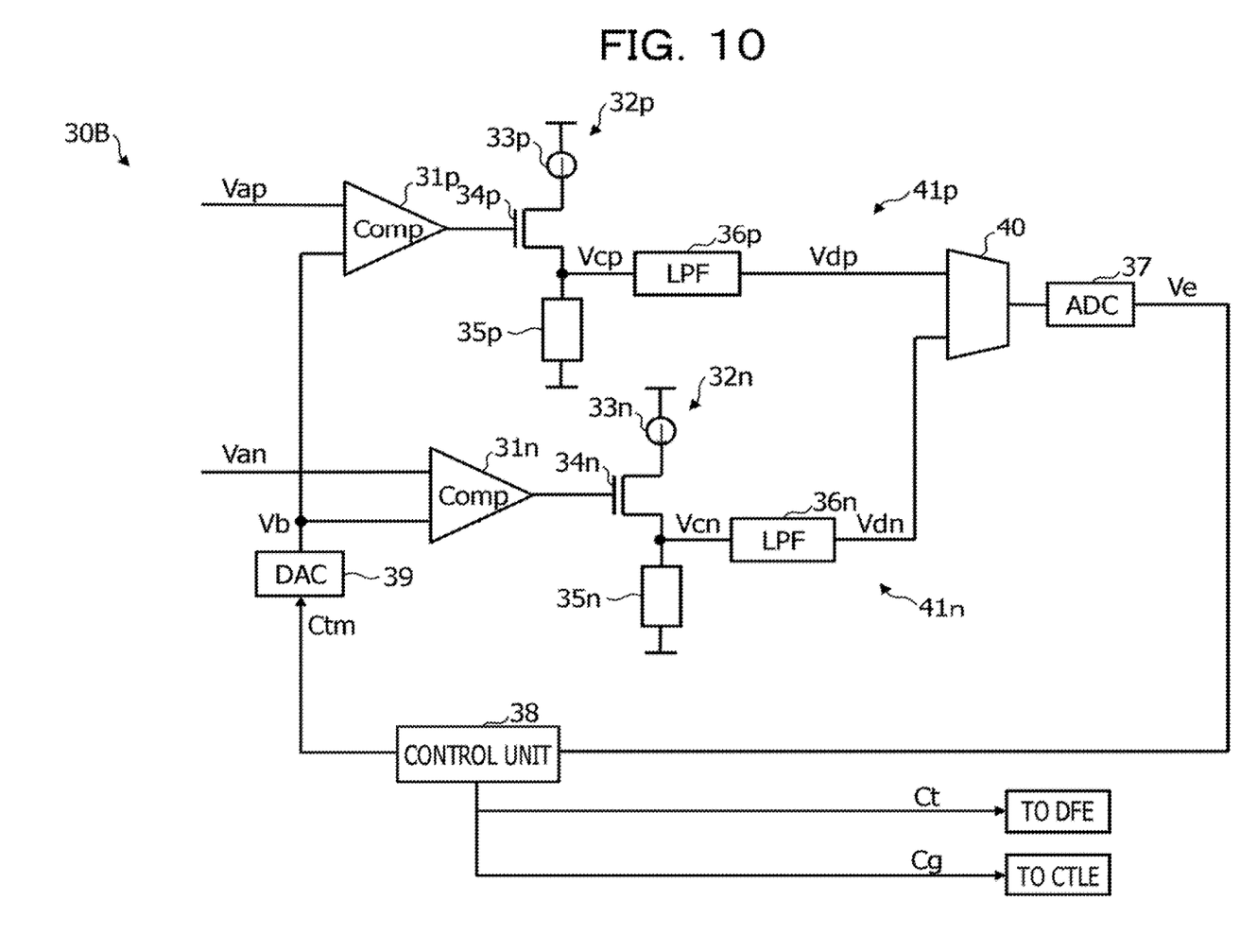
FIG. 10 is a diagram illustrating a second configuration example of a monitor circuit.

FIG. 10 is a diagram illustrating a second configuration example of a monitor circuit. A monitor circuit 30B illustrated in FIG. 10 is an example of the monitor circuit 30 (see FIG. 2). The monitor circuit 30B monitors the magnitude of the differential input waveform Va. The monitor circuit 30B includes a monitor unit 41p on the positive side for monitoring the magnitude of the positive-side input waveform Vap of the differential waveform Va, and a monitor unit 41n on the negative side for monitoring the magnitude of the negative-side input waveform Van of the differential input waveform Va. The monitor unit 41p includes a comparator 31p, a level conversion circuit 32p, and an LPF 36p. The monitor unit 41n includes a comparator 31n, a level conversion circuit 32n, and an LPF 36n. The level conversion circuit 32p includes a series circuit in which a current source 33p, a transistor 34p, to which the current is supplied from the current source 33p, and a resistor 35p coupled to the transistor 34p are coupled in series. The level conversion circuit 32n includes a series circuit in which a current source 33n, a transistor 34n, to which the current is supplied from the current source 33n, and a resistor 35n coupled to the transistor 34n are coupled in series. The threshold value Vb output from the DAC 39 is supplied to both the positive-side comparator 31p, to which the input waveform Vap is input, and the negative-side comparator 31n, to which the input waveform Van is input.

The monitor circuit 30B includes a selector 40 configured to select the monitor unit 41p and the monitor unit 41n. Any one of the analog signal Vdp output from the LPF 36p configured to smooth a positive-side pulse waveform Vcp and the analog signal Vdn output from the LPF 36n configured to smooth a negative-side pulse waveform Vcn is supplied to the ADC 37 by the selector 40. In order to accurately determine the value of the reception signal even during normal operation of the reception circuit and the receiver, it is preferable for the monitor circuit 30B to monitor the input waveform Va while periodically performing the switching by the selector 40.

Figure 11:
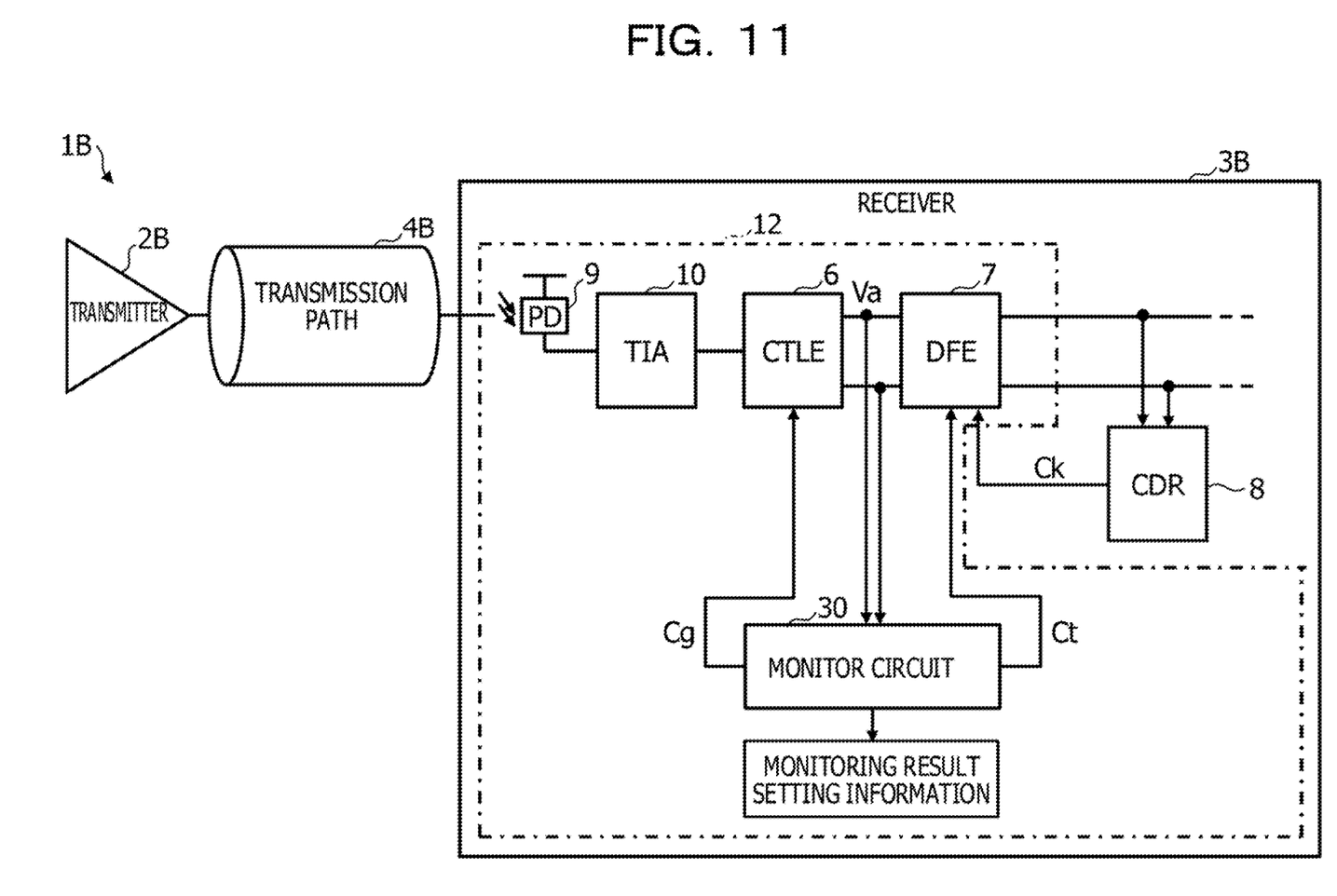
FIG. 11 is a diagram illustrating a configuration example of a transmission system in a case of an optical interface.

FIG. 11 is a diagram illustrating a configuration example of a transmission system in a case of an optical interface. A transmission system 18 illustrated in FIG. 11 includes a transmitter 2B configured to transmit a signal, a transmission path 4B, in which the signal transmitted from the transmitter 28 is transmitted, and a receiver 3B configured to receive the signal transmitted from the transmitter 2B via the transmission path 48.

Since the transmitter 2B is similar to the transmitter 2 (see FIG. 1), detailed description thereof will be omitted. The transmission path 4B is an optical communication path coupled between the transmitter 2B and the receiver 38. Specific examples of the transmission path 4B include an optical fiber and a coupler.

The receiver 3B includes a reception circuit 12 and a CDR circuit 8. The reception circuit 12 receives a signal from the transmission path 48. The reception circuit 12 includes a photodiode (PD) 9, a transimpedance amplifier (TIA) 10, a CTLE 6, a DFE 7, and a monitor circuit 30. The PD 9 is a light receiving element configured to convert received light into a current. The TIA 10 converts an output current of the PD 9 into a voltage. An output voltage of the TIA 10 corresponds to the data signal D input to the CTLE 6.

Even in such an optical interface system, it is possible to accurately determine the value of the reception signal in the same manner as in the electric interface system described above.

As described thus far, according to the present embodiment, the gain control code Cg used for setting the gain of the CTLE 6 and the threshold voltage control code Ct used for setting the threshold voltage of the DFE 7 are generated in accordance with the monitoring result Ve, thereby making it possible to accurately determine the value of the reception signal. The functions of the control unit are enabled by, for example, operating a processor such as a CPU by a program stored in a memory in a readable manner.

Although the reception circuit, the receiver, and the reception control method have been described according to the embodiment, the present disclosure is not limited to the above-described embodiment. Various alterations and modifications such as combination and replacement with part or whole of other embodiments may be made within the scope of the present disclosure.

For example, the reception circuit, the receiver, and the reception control method when used in an electric interface, may be applied to a backboard transmission, a transmission between a host and a repeater, a transmission between a host and an optical module, and a transmission between a repeater and an optical module. Moreover, the reception circuit, the receiver, and the reception control method when used in an optical interface, may be applied to a transmission between optical modules and a transmission between on-board optical modules (for example, consortium for on-board optics (COBO)).

With regard to the embodiment, the following appendices are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A reception circuit comprising:
   a first equalizer configured to equalize a reception waveform;
   a second equalizer configured to equalize an input waveform from the first equalizer;
   a monitor configured to monitor magnitude of the input waveform; and
   a controller configured to generate a gain control code used for setting a gain of the first equalizer and a threshold voltage control code used for setting a threshold voltage to be compared with the input waveform in the second equalizer, in accordance with a monitoring result of the magnitude obtained by the monitor,
   the monitor monitors the magnitude by comparing the input waveform with a threshold value, smooths a pulse waveform to be generated by comparing the input waveform with the threshold value, and then monitors the magnitude.

2. The reception circuit according to claim 1, wherein the controller specifies a control code range corresponding to a variation width of the input waveform in accordance with the monitoring result, and adjusts the gain control code in accordance with a width of the control code range.

3. The reception circuit according to claim 2, wherein the controller adjusts the gain control code to cause the control code range to be fixed.

4. The reception circuit according to claim 2, wherein the controller specifies the control code range corresponding to the variation width of the input waveform in accordance with the monitoring result, and adjusts the threshold voltage control code to a code corresponding to the control code included in the control code range.

5. The reception circuit according to claim 4, wherein the controller specifies the control code range by specifying a first control code to cause the magnitude to converge or reach to a maximum value, and a second control code to cause the magnitude to converge or reach to a minimum value.

6. The reception circuit according to claim 4, wherein the control code range is a range of a threshold control code used for setting the threshold value.

7. The reception circuit according to claim 6, wherein
the second equalizer includes a first setting portion configured to set the threshold voltage in accordance with the threshold voltage control code,
the monitor includes a second setting portion having a configuration and characteristics identical to a configuration and characteristics of the first setting portion, and configured to set the threshold value in accordance with the threshold control code, and
a code corresponding to the control code is identical to the code of the control code.

8. The reception circuit according to claim 6, wherein
the second equalizer includes a first setting portion configured to set the threshold voltage in accordance with the threshold voltage control code,
the monitor includes a second setting portion having a different configuration or different characteristics from the first setting portion, and configured to set the threshold value in accordance with the threshold control code, and
the controller sets the threshold voltage control code to a code corresponding to the control code, based on correlation data between the first setting portion and the second setting portion.

9. The reception circuit according to claim 7, wherein the first setting portion and the second setting portion are digital to analog converters.

10. The reception circuit according to claim 4, wherein the code corresponding to the control code is a code to cause the threshold voltage to intersect with an eye opening of the input waveform.

11. The reception circuit according to claim 1, wherein the controller adjusts the threshold voltage control code to cause the threshold voltage to intersect with an eye opening of the input waveform, in accordance with the monitoring result.

12. The reception circuit according to claim 1, wherein the controller adjusts the gain control code in accordance with an amount of excess or deficiency of the magnitude.

13. The reception circuit according to claim 1, wherein the controller adjusts the gain control code to cause the magnitude to have a desired value in accordance with the monitoring result.

14. The reception circuit according to claim 1, wherein the monitor monitors the magnitude at a frequency lower than a frequency of the reception waveform.

15. A receiver comprising:
a first equalizer configured to equalize a reception waveform;
a second equalizer configured to equalize an input waveform from the first equalizer;
a monitor configured to monitor magnitude of the input waveform; and
a controller configured to generate a gain control code used for setting a gain of the first equalizer and a threshold voltage control code used for setting a threshold voltage to be compared with the input waveform in the second equalizer, in accordance with a monitoring result of the magnitude obtained by the monitor; and
a clock data recovery circuit configured to reproduce digital data and a clock signal from an output signal of the second equalizer,
the monitor monitors the magnitude by comparing the input waveform with a threshold value, smooths a pulse waveform to be generated by comparing the input waveform with the threshold value, and then monitors the magnitude.

16. A reception control method comprising:
equalizing a reception waveform by a first equalizer;
equalizing, by a second equalizer, an input waveform from the first equalizer;
monitoring magnitude of the input waveform by a monitor; and
generating, by a controller, a gain control code used for setting a gain of the first equalizer and a threshold voltage control code used for setting a threshold voltage to be compared with the input waveform in the second equalizer, in accordance with a monitoring result of the magnitude obtained by the monitor,
the monitor monitors the magnitude by comparing the input waveform with a threshold value, smooths a pulse waveform to be generated by comparing the input waveform with the threshold value, and then monitors the magnitude.

17. The reception circuit according to claim 1, wherein the controller estimates a variation width of the input waveform in accordance with the monitoring result, and generates the gain control code and the threshold voltage control code in accordance with an estimation result of the variation width.

18. The reception circuit according to claim 17, wherein
the controller estimates the variation width by sweeping a threshold control code used for setting the threshold value.

* * * * *